Oct. 13, 1970   R. C. FUTTY ET AL   3,533,605
VIBRATING HOPPER ARRANGEMENT
Filed June 7, 1968
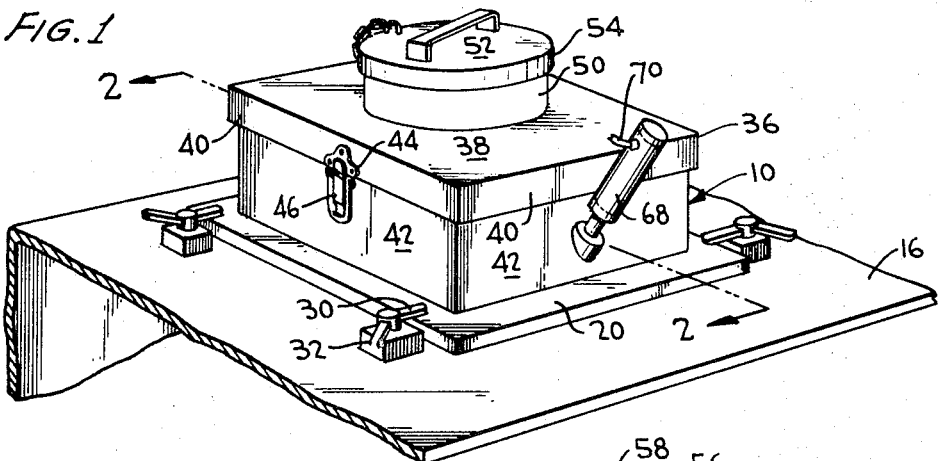
FIG. 1
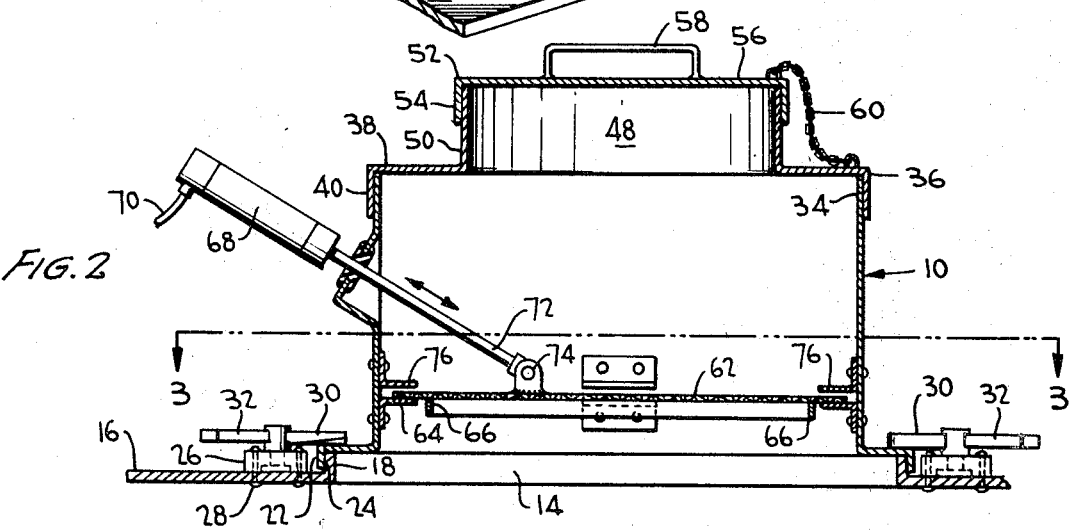
FIG. 2
FIG. 3
INVENTORS,
ROBERT C. FUTTY
JOHN L. KUGLE
RALPH W. COHO, JR.
BY Jacobi & Davidson
ATTORNEYS

United States Patent Office 3,533,605
Patented Oct. 13, 1970

3,533,605
VIBRATING HOPPER ARRANGEMENT
Robert C. Futty, Willow Street, and John L. Kugle, and Ralph W. Coho, Jr., Lancaster, Pa., assignors to Irl Daffin Associates, Incorporated, Lancaster, Pa., a corporation of Pennsylvania
Filed June 7, 1968, Ser. No. 735,316
Int. Cl. B28c 7/04
U.S. Cl. 259—164                                13 Claims

ABSTRACT OF THE DISCLOSURE

A vibrating hopper arrangement for aerating and feeding cement into a storage container of a concrete production plant includes a hopper provided with a top opening through which bags of cement may be loaded into the hopper. The top opening is closed by a removable main lid that is also provided with an opening through which bulk material may be introduced into the hopper by a conventional boot member. The opening in the main lid is also provided with a removable cover. A screen member is mounted for transverse reciprocation across the lower discharge portion of the vibrating hopper and reciprocated by a conventional motor. Reciprocation of the screen member causes the removal of any lumps of cement and/or extraneous matter that may be present in the cement being discharged by the hopper.

BACKGROUND OF THE INVENTION

The present invention relates to material handling and more particularly to the dispensing of cement from a hopper to a cement storage container, located on a concrete production plant, from which it is fed to the concrete mixing mechanism which forms a part of such production plant.

Existing concrete production plants where cement is stored in a compartment and fed therefrom to a concrete mixing mechanism, have not been entirely satisfactory since the cement delivered to such storage compartment by either bag or bulk loading often contained objectionable lumps of cement and/or extraneous matter that resulted in a final concrete mix that contained lumps of cement and/or extraneous matter. In many instances, in order to reduce the presence of these lumps of cement and/or extraneous matter in the final concrete mix, an increase in mixing time was found to be necessary. Due to this necessary increase in mixing time, the maximum possible daily output of a concrete production plant could not be attained.

Taking into consideration the foregoing deficiencies, it is the primary object of the present invention to provide a vibrating hopper arrangement that eliminates these deficiencies and is reliable in operation.

Another object of the invention is to provide a vibrating hopper for feeding cement to the cement storage compartment of a cement production plant that removes any lumps of cement and/or extraneous matter contained in the cement being fed to such cement storage compartment.

Yet another object of the invention is to provide a vibrating hopper for feeding cement to a concrete production plant which includes a screen arranged to reciprocate across the path of discharge from said vibrating hopper so as to effect removal of any lumps contained in the cement loaded into said hopper.

Still another object of the invention is to provide such a vibrating hopper, including a screen arranged to reciprocate across the path of discharge from said hopper, with a motive means for effecting reciprocation of said screen.

A further object of the invention is to provide a vibrating hopper for feeding cement to a cement storage compartment of a concrete production plant wherein said hopper includes a top opening provided with a main lid through which bags of cement may be loaded into the hopper.

A still further object of the invention is to provide a vibrating hopper for feeding cement into a storage compartment of a concrete production plant wherein said hopper includes a top opening provided with a main lid through which bags of cement may be loaded into the hopper, and wherein said main lid is also provided with an opening, normally closed by another lid, through which bulk material may be introduced into the hopper by a conventional boot member.

The invention will be better understood and objects other than those set forth above will become apparent after reading the following description thereof. Such description refers to the annexed drawings presenting preferred and illustrative embodiments of the invention.

In the drawings:

FIG. 1 is a perspective view of a vibrating hopper, according to the present invention, shown mounted on a section of a cement storage container.

FIG. 2 is a sectional view of the vibrating hopper taken on the line 2—2 of FIG. 1.

FIG. 3 is a sectional view of the vibrating hopper taken along the line 3—3 of FIG. 2.

DESCRIPTION OF THE PREFERRED EMBODIMENT

Referring to the drawings, it is to be noted that the device disclosed therein includes a hopper 10 having a discharge end construction 12 arranged to fit snugly over the inlet opening 14 of a cement storage container 16.

The inlet opening 14 of the cement storage container 16 may have a cross-section of any desired shape but is, preferably, formed rectangular and provided with an upwardly directed flange 18 that extends completely around the inlet opening 14 of the cement storage container 16.

The discharge end 12 of the hopper 10 includes an outwardly directed portion 20 that extends over the upper edge of the upwardly directed flange 18 and a downwardly directed flange 22 that completely surrounds the lateral portion 24 of the upwardly directed flange 18.

The hopper 10 is removably secured to the cement storage container 16, about opening 14, by a plurality of locking members 26 that are attached to the cement storage container by any suitable means, such as bolts or rivets 28. Each locking member includes a rotatably supported finger portion 30 that can be rotated by handle 32 to a position where it bears against the upper surface of outwardly directed portion 20 of hopper 10 and forces the lower surface portion 20 of hopper 10 into tight engagement with the upper edge of flange 18 or to a position out of engagement with said upper surface where it permits removal of the hopper 10 from the cement storage container.

Hopper 10 is provided with a top opening 34 which is closed by a removable main lid 36 that has a top surface 38 and depending side portions 40 that, respectively, engage over the outer side walls 42 of the hopper 10. The depending portions 40 of the main lid 36 are provided with latch parts 44 that cooperate, respectively, with latch parts 46 supported on side walls 42 of the hopper 10 in a manner to secure main lid 36 to hopper 10.

Main lid 36 is provided with a tubular inlet passage means 48 which may be of any desired shape in cross-section and may be cylindrical as illustrated in FIG. 1. Inlet passage means 48 has a cylindrical external surface 50 and the entrance to the inlet passage means is closed by a top lid 52 that has a depending cylindrical portion 54 that engages around the upper portion of external surface 50 of inlet passage means 48.

The upper surface 56 of top lid 52 is provided with a handle 58 to facilitate removal of top lid 52 so as to expose the entrance of inlet passage means 48. A chain 60 is attached between the main lid 36 and top lid 52 to prevent their separation.

A screen member 62 is mounted transversely across the lower discharge portion of hopper 10 and is arranged to rest upon retainer members 64. The screen member 62 has a configuration which corresponds to the cross-sectional shape of the discharge portion of hopper 10 which, as illustrated in the drawings, is rectangular. The screen member 62 is, however, sufficiently smaller than the transverse cross-section of the discharge portion of the hopper 10 so that it may be reciprocated or vibrated transversely across the discharge portion of said hopper. A rectangular bracing means 66 is secured to the lower surface of screen member 62. The size of the rectangular bracing means 66 is designed so that the distances between any point on it and a point on the retainer lying in the same plane is less than the distance between a point on the periphery of the screen member 62 and a point on the surface of the hopper 10 lying in the same plane. By this construction, should there be a tendency of an associated reciprocating or vibrating means to effect reciprocation or vibration of the screen member 62 to an extent that would cause the periphery of the screen to be forced harmfully against the wall of the hopper 10, this tendency would be nullified by the engagement of rectangular bracing means 66 with the edge of a retainer 64.

Reciprocation or vibration of screen 62 may be effected by any well known reciprocating or vibrating motor means. As an example of such a motor means, a fluid motor 68 is illustrated in the drawings. This fluid motor includes a piston (not illustrated) which is actuated in at least one direction by fluid under pressure, either a liquid or gas, and preferably air, admitted through conduit 70 and in the opposite direction by a spring means or fluid under pressure (not illustrated) upon release of the fluid under pressure admitted through said conduit 70.

Reciprocation of the motor 68 produces reciprocation of connecting rod 72 that passes through grommet 73. The connecting rod 72 is attached to the screen 62 by a swivel coupling 74. Retainers 76 prevent excessive lifting of the screen 62 above retainers 64 during operation of fluid motor 68.

The vibrating hopper arrangement disclosed may be operated in either of two ways for feeding cement into a cement storage container depending on whether the cement to be loaded into the container is supplied in bags or in bulk. If cement is supplied in bags, the main lid 36, along with top lid 52, is removed and cement is loaded into the hopper through hopper top opening 34.

Should the cement be supplied in bulk, top lid 52 would be removed and cement loaded into hopper 10 by a boot inserted into the inlet passage means 48.

The cement which has been loaded into the hopper 10 rests upon screen 62. When the screen 62 is reciprocated by the motor 68 and connecting rod 72, cement will pass through the screen in the form of dispersed fine particles. Any lumps of cement and/or extraneous matter which may be contained in the loaded cement, and which remain on screen 62, will be gradually removed by the reciprocating action of the screen 62.

After reading the foregoing detailed description, it will be apparent that the objects of the invention set forth originally have been successfully achieved. Accordingly,

What is claimed is:

1. A vibrating hopper arrangement for supplying cement into a cement storage container of a cement production plant comprising a hopper having side walls and provided with cement discharge opening means at one end and a top cement loading opening means at its other end; a screen member; means for supporting said screen member across said hopper in the path of discharge from said hopper; said screen member being dimensioned with respect to said hopper side walls to permit reciprocation thereof with respect to said side walls of said hopper; and means for simultaneously effecting reciprocation of said screen member in two planes.

2. A vibrating hopper arrangement as defined in claim 1, wherein said means for effecting reciprocation of said screen member simultaneously effects reciprocation of said screen member in the vertical and horizontal planes.

3. A vibrating hopper arrangement as defined in claim 2, wherein said screen member includes a bracing means.

4. A vibrating hopper arrangement as defined in claim 2 wherein said screen member includes bracing means positioned to cooperate with said screen supporting means to limit reciprocation of said screen member.

5. A vibrating hopper arrangement as defined in claim 2, wherein said hopper and said screen are rectangular in cross-section.

6. A vibrating hopper arrangement as defined in claim 2, wherein said means for effecting reciprocation of said screen member is a motor.

7. A vibrating hopper arrangement as defined in claim 2, wherein said means for effecting reciprocation of said screen member is a fluid motor having a connecting rod passing through a grommet located in a side wall of said hopper.

8. A vibrating hopper for supplying cement into a cement storage container of a cement production plant comprising a hopper having side walls and provided with cement discharge opening means at one end and a top cement loading opening means at the other end; a screen member mounted for reciprocation across said cement discharge opening; means for simultaneously effecting multi-directional reciprocation of said screen member; and a main lid for said top loading opening.

9. A vibrating hopper as defined in claim 8 wherein said main lid is provided with a tubular passage means extending therethrough.

10. A vibrating hopper as defined in claim 9 wherein said tubular passage means is provided with a cover.

11. A vibrating hopper as defined in claim 10 wherein said main lid is secured to said cover by a chain.

12. A vibrating hopper arrangement for supplying cement into a cement storage container of a cement production plant comprising a hopper having side walls and provided with cement discharge opening means at one end and a top cement loading opening means at its other end; a screen member; means for supporting said screen member across said hopper in the path of discharge from said hopper; said screen member being dimensioned with respect to said hopper side walls to permit reciprocation thereof with respect to said side walls of said hopper; means for effecting reciprocation of said screen member; and means mounted on the side walls of said hopper and spaced above said means for supporting said screen member for limiting upward movement of said screen member.

13. A vibrating hopper arrangement for supplying cement into a cement storage container of a cement production plant comprising a generally rectangular hopper having side walls and provided with cement discharge opening means at one end and a top cement loading opening means at its other end, said top cement loading opening means being provided with a main lid, said main lid being provided with a tubular passage means extending therethrough, said tubular passage means being provided with a cover, and wherein said main lid is secured to said cover by a chain; a generally rectangular screen member; means for supporting said screen member across said hopper in the path of discharge from said hopper; said screen member being dimensioned with respect to said hopper side walls to permit reciprocation thereof with respect to said side walls of said hopper; said screen member including bracing means positioned to cooperate with said screen supporting means to limit reciprocation of said screen member; means mounted on the side walls of said hopper and spaced above said means for supporting said screen member for limiting upward movement of said screen member; means for effecting reciprocation of said screen member, said means for effecting reciprocation of said screen member comprising a fluid motor having a connecting rod passing through a grommet disposed in a side wall of said hopper.

References Cited

UNITED STATES PATENTS

| | | | |
|---|---|---|---|
| 59,927 | 11/1866 | Robertson | 209—244 |
| 77,578 | 5/1868 | Breasted | 209—244 |

ROBERT W. JENKINS, Primary Examiner

U.S. Cl. X.R.

259—47